United States Patent

[11] 3,614,573

| [72] | Inventors | Willis E. Rieman<br>Skaneateles;<br>Edward R. Betz, Auburn, both of N.Y. |
|---|---|---|
| [21] | Appl. No. | 9,000 |
| [22] | Filed | Feb. 5, 1970 |
| [45] | Patented | Oct. 19, 1971 |
| [73] | Assignee | Gulf & Western Systems Company<br>New York, N.Y. |

[54] INTERMITTENT CONTROL FOR WINDSHIELD WIPER SYSTEMS
10 Claims, 1 Drawing Fig.

[52] U.S. Cl.................................................. 318/443, 318/472
[51] Int. Cl....................................................... B60s 1/08
[50] Field of Search.......................................... 318/443, DIG. 2, 471, 472, 473, 334; 15/250.12, 250.02, 250.17

[56] References Cited
UNITED STATES PATENTS
3,351,836  11/1967  Kearns ......................... 318/443
3,487,282  12/1969  Gasiorek et al................ 318/443

FOREIGN PATENTS
1,085,797  10/1967  Great Britain................ 318/443

*Primary Examiner*—Oris L. Rader
*Assistant Examiner*—Robert J. Hickey
*Attorney*—Amster & Rothstein ABSTRACT: An intermittent control for a windshield wiper system. One of the two motor terminals is connected to the battery and the second motor terminal is connected to ground through the conventional park switch. In parallel with the park switch is a normally off SCR. A relaxation oscillator triggers the SCR to provide a momentary path to ground for the motor current. As soon as the park switch moves to provide a path to ground, the SCR turns off. The charging circuit of the relaxation oscillator includes a thermistor, heat-coupled to a resistance element in the motor circuit, for causing the dwell period to increase with windshield drag. A potentiometer is also provided in the charging circuit to allow manual adjustment of the dwell period. An additional thermistor in the motor circuit, also heat-coupled to the resistance element, causes the motor speed to slow down as the drag on the wiper blades increases. A circuit is provided for causing the SCR to turn on immediately when the control switch is operated, thus initiating a wipe cycle immediately independent of the operation of the relaxation oscillator.

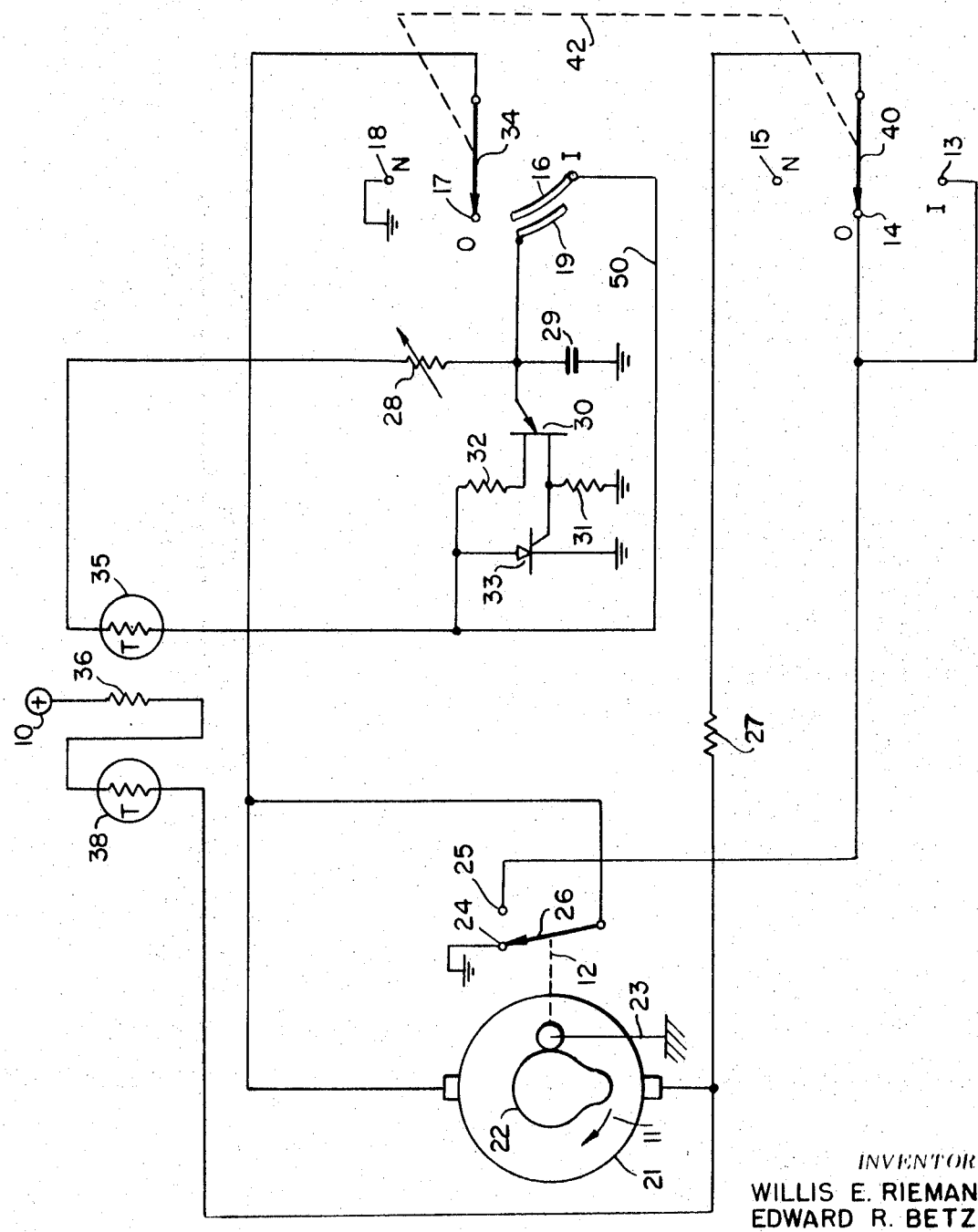

INTERMITTENT CONTROL FOR WINDSHIELD WIPER SYSTEMS

This invention relates to windshield wiper systems, and more particularly to arrangements for controlling the intermittent operations thereof.

Conventional windshield wiper systems, powered by DC electric motors, cycle continuously at a selected speed until manually switched off. However, there are a number of systems in the prior art which allow the driver to switch from a continuous operation to an intermittent operation in which a dwell period follows each wipe cycle. A dwell period between wipe cycles is advantageous at times when the windshield is only partially wet and the demand for wiping is less than that afforded by the normal low-speed operation.

Generally, the prior art windshield wiper systems were made of electromechanical components; they were complicated, expensive and tended to have poor control characteristics. Some of the prior art electromechanical systems also provided for an automatic variation of the dwell period—the well period increased as the windshield became drier. But these automatic control systems also suffered from the same disadvantages as the manually controlled electromechanical intermittent dwell systems.

In recent times, transistorized windshield wiper systems have been designed. These systems are generally simpler than their electromechanical counterparts and generally have better control characteristics. There exists a need to provide an automatically variable dwell period in a transistorized intermittent control system. Furthermore, such automatically variable dwell period control mechanism should not significantly increase the cost of the transistorized system or deteriorate its control characteristics.

It is a general object of our invention to provide an automatic transistorized intermittent wiper control system which is simple in design, reliable and relatively inexpensive to manufacture.

Briefly, in accordance with the principles of our invention, a silicon controlled rectifier is placed in series with the winding of the motor which drives the wiper blades. When the rectifier is triggered to conduction, the motor turns on. As soon as the blades move out of the park position, a cam actuated switch provides an alternate path for the motor current and the SCR turns off. The SCR is triggered by a relaxation oscillator, the charging cycle of the oscillator beginning only when the wiper blades are placed in the park position and the motor turns off at the end of each cycle. This allows accurate control of the dwell period—the dwell period is determined solely by the period of the relaxation oscillator.

The relaxation oscillator itself includes an RC charging circuit. The resistance in this charging circuit includes both a manually controlled potentiometer and a thermistor which is heat-coupled to a heating element. The heating element is in series with the motor winding and its temperature is DETERMINED BY the magnitude OF THE MOTOR CURRENT. The greater the drag on the wiper blades, the greater the motor current and the hotter the heating element. This in turn increases the thermistor impedance to cause a longer charging cycle, that is, a longer dwell period. Consequently, the dwell period increases as the windshield becomes drier (a dry windshield produces the greatest drag). Thus, the dwell period is automatically controlled by the condition of the windshield (in addition to the manual control provided by the variable potentiometer). A second thermistor, also controlled by the temperature of the heating element, can be placed in series with the motor winding to control the motor speed—the drier the windshield, the slower the motor.

It is a feature of our invention to provide a transistorized relaxation oscillator for initiating the operation of a windshield wiper motor, the charging cycle of the relaxation oscillator being varied by manual operation of a potentiometer and/or a thermistor heated by a heating element connected in the motor circuit.

Further objects, features and advantages of out invention will become apparent upon consideration of the following detailed description in conjunction with the drawing.

The drawing depicts a conventional DC motor 21 used in a windshield wiper system. Although not shown in the drawing, it is to be understood that when the motor rotates in the direction shown by arrow 11, a crank shaft of the motor dries the windshield wiper linkage. Also, while the illustrative embodiment of the invention is a constant-speed system, it will be apparent to those skilled in the art that the invention is applicable to multiple-speed motors. The invention is applicable to multiple-speed motors. The invention is applicable to such motors with permanent magnet or wound fields, and to motors with and without depressed park capabilities.

Cam 22 rotates with the output shaft and controls the position of follower 23 which, in turn, as shown by dotted line 12, controls the position of switch 26. The cam is so arranged that switch 26 moves to contact 25 when the wiper blades are in the bottom portion, or park position, of the wipe cycle. During the movement of the wiper blades across the windshield, switch 26 engages contact 24. Switch 26 is the conventional park switch found in present-day windshield wiper systems.

Switches 34 and 40 are ganged together as shown by dotted line 42. Each switch has three respective positions. Switch 34 engages "on" contact 18 when continuous wiping is desired, "off" contact 17 when no wiping is necessary, and "intermittent" contact 16 when intermittent wiping is called for. The respective contacts for switch 40 are on contact 15, off contact 14 and intermittent contact 13. When the two switches are in their off positions, no current flows from battery 10. The battery is coupled along one path through resistor (heating element) 36, thermistor 38 and the motor winding to switch 34, and along a second path through resistor 36, thermistor 38 resistor 27, switch 40 and switch 26 (connected to contact 25 when the system is off) to the same switch 34. Since switch 34 is connected to floating contact 17 there is no battery drain. If switches 34 and 40 are switched off during the progress of a wipe cycle, switch 26 remains connected to contact 24 and the motor current flows through switch 26 to ground. As soon as the cycle in progress is completed, switch 26 moves over to contact 25 and the motor comes to a halt.

For normal continuous cycling, switches 34 and 40 are moved to the respective on contacts. This completes a circuit from battery 10 to ground through resistor 36, thermistor 38, the motor winding, switch 34 and contact 18. As soon as the wiper blades start to move, switch 26 moves from contact 25 to contact 24. The motor continues to operate because contact 24 simply provides an alternate path to ground. At the end of each cycle, although switch 26 moves to contact 25, the motor still continues to operate because switch 34 still provides a ground through contact 18 to one end of the motor winding. The movement of switch 26 back and forth between contacts 24 and 25 has no effect on the system operation. (When the switch engages contact 25, no other effects occur since contact 25 is connected to contacts 13 and 14 while switch 40 engages floating contact 15 when the system is operated in the normal mode.) The system continues to cycle until switches 34 and 40 are turned off. At this time the cycle in progress continues because switch 26 still engages contact 24. But as soon as the switch moves to contact 25, the motor remains off with the wiper blades in the proper park position.

Switches 34 and 40 are moved to their respective intermittent positions when a variable dwell period between successive blade cycles is desired. In the intermittent mode of operation, it is desirable for the system to turn on as soon as the switches are moved to the intermittent positions; the blades should immediately make one cycle across the windshield and then dwell at the bottom portion of the cycle, after which the cycle should be repeated.

Initially, SCR 33 is off because its anode is extended over conductor 50 to contact segment 16 which is not engaged by switch 34. When switch 34 is moved to its intermittent position, the positive potential of source 10 is extended through resistor 36, thermistor 38, the motor winding, switch 34 and conductor 50 to the anode of the SCR. However, the SCR turns on only when a positive potential is applied to its control terminal. The purpose of contact segment 19 is to control the immediate turning on of SCR 33 when switch 34 is moved from its off position to its intermittent position. The potential of battery 10 is extended directly to the junction of capacitor 29 and the emitter of unijunction transistor 30. The capacitor charges rapidly and the unijunction transistor 31 fires SCR 33. Current thus flows through the motor winding, switch 34 and the SCR to ground. The wiper blades start to move immediately when switch 34 is moved away from its off position to its intermittent position.

As soon as switch 26 engages contact 24, the motor current no longer flows through the SCR. The anode of the SCR is now grounded so the SCR turns off. Capacitor 29 remains discharged during the blade movement.

At the end of the wiper cycle, the blades are in their lowermost position and switch 26 moves from contact 24 to contact 25. In order to bring the system to an abrupt stop, preventing it from overtraveling and having switch 26 reengage contact 24, brake resistor 27 is provided. As soon as switch 26 moves to contact 25, the low-magnitude resistor 27 is placed directly across the motor winding. The motor current is dissipated in the resistor and the motor comes to an abrupt halt. The brake resistor functions this way in both normal and intermittent modes when switch 40 serves to connect to contact 25. (During normal operation, braking is not required so contact 15 is left floating.)

It should be noted that at the start of each cycle, before switch 26 has moved to contact 24, resistor 27 is across the motor winding. Although the resistor has a magnitude of only several ohms, the motor winding has an even lower impedance and thus most of the current from battery 10 flows through the motor. As soon as the motor moves sufficiently to allow contact 26 to engage contact 24, resistor 27 is removed from the circuit to prevent current drain.

At the end of each wiper cycle in the intermittent mode, the SCR remains off even though its anode is at the potential of source 10. To trigger the SCR it is necessary for transistor 30 to conduct. When the wiper system is first turned on, switch 34 engages contact segment 19 to quickly charge capacitor 29 and fire the unijunction transistor and the SCR. But after the switch is finally placed in its intermittent position, it no longer engages contact segment 19. Thus, capacitor 29 does not quickly charge from a direct connection to switch 34 and the SCR remains off. Instead, the capacitor charges from current flowing through thermistor 35 and potentiometer 28, the charging rate being determined by the magnitudes of the two elements. When the capacitor charges to the level sufficient to fire the unijunction transistor, the potential across resistor 31 rises and SCR 33 is fired. The capacitor discharges through the unijunction transistor and resistor 31 preparatory to the next cycle. The SCR remains on only until switch 26 moves from contact 25 to contact 24—just as it does during the first cycle as described above.

It is thus apparent that the dwell period is determined solely by the charging of capacitor 29, which charging begins at the end of each wipe cycle. In order to increase the dwell period, all that is required is to increase the magnitude of the resistance in the charging circuit. This can be accomplished by manually adjusting potentiometer 28—the higher the setting, the longer the dwell period.

In accordance with the principles of out invention, the dwell period is also automatically controlled by thermistor 35. The thermistor is heat coupled to heating element 36 which is in the motor circuit. The temperature of resistor 36 is determined by the motor current, and the motor current is in turn a function of the drag on the wiper blades. The temperature of the resistance element is thus a measure of the dryness of the windshield—the drier the windshield, the hotter the resistance element. Thermistor 35, heat-coupled to the resistance element, increases in impedance as the temperature of the resistance element increases. Since the thermistor is in series with potentiometer 28, it is apparent that the dwell period is determined not only by the setting of the potentiometer, but also by the impedance of the thermistor. As the windshield becomes drier, the temperature of resistance element 36 increases and the impedance of thermistor 35 increases. This in turn results in a longer dwell period which is the desired effect; as the windshield becomes drier the frequency of the wiping cycles can be reduced.

It is also desirable to have the motor slow up as the windshield becomes drier since the greatest wiper speed is necessary only when the windshield is wet. As the windshield becomes drier and the temperature of resistance element 36 increases, the impedance of thermistor 38 similarly increases. Since the thermistor is in series with the motor circuit, a reduced current flows as the impedance of the thermistor goes up. This in turn results in a slower motor speed.

Although the invention has been described with reference to a particular embodiment it is to be understood that this embodiment is merely illustrative of the application of the principles of the invention. Numerous modifications may be made therein and other arrangements may be devised without departing from the spirit and scope of the invention.

We claim:

1. An intermittent control for a windshield wiper system comprising a motor for driving windshield wiper blades through a wipe cycle, a resistance element connected in series with said motor, said motor including two terminals, first means for connecting a first one of said two terminals to a source of a first potential, second means for connecting the second one of said two terminals to a source of a second potential, said second connecting means including two parallel paths, a first of said paths including a motor park switch and the second of said paths including semiconductor means for conducting current after a turn-on pulse is applied thereto, and means for generating a turn-on pulse for application to said semiconductor means at a time after the completion of a wipe cycle which is dependent upon the magnitude of the current having flowed through said motor, said pulse generating means including a charging circuit having a thermistor heat-coupled to said resistance element, the temperature of said resistance element being dependent upon the current having flowed through said motor.

2. An intermittent control for a windshield wiper system in accordance with claim 1 further including switch means in said second path for selectively connecting said second motor terminal to said semiconductor means, said switch means including means for immediately causing a turn-on pulse to be generated and applied to said semiconductor means when said switch means is first operated independent of the operation of said charging circuit.

3. An intermittent control for a windshield wiper system in accordance with claim 2 further including an additional thermistor connected in series with said motor, said additional thermistor being heat-coupled to said resistance element for controlling said motor current to decrease as the temperature of said resistance element increases.

4. An intermittent control for a windshield wiper system in accordance with claim 1 further including an additional thermistor connected in series with said motor, said additional thermistor being heat-coupled to said resistance element for controlling said motor current to decrease as the temperature of said resistance element increases.

5. An intermittent control for a windshield wiper system in accordance with claim 2 wherein said charging circuit further includes a manually controlled potentiometer in series with said thermistor.

6. An intermittent control for a windshield wiper system in accordance with claim 1 wherein said charging circuit further includes a manually controlled potentiometer in series with said thermistor.

7. An intermittent control for a windshield wiper system in accordance with claim 6 wherein said motor park switch is operative to connect said second motor terminal to said source of said second potential when said motor is out of its park position, and further including a brake resistance, said motor park switch being further operative to connect said brake resistance across said motor terminals when said motor is in its park position.

8. An intermittent control for a windshield wiper system in accordance with claim 1 further including switch means having three positions, a first of said positions for deenergizing said motor, the second of said positions for connecting said second motor terminal to said source of said second potential bypassing said second connecting means, and the third of said positions for enabling the operation of said second path connecting means.

9. An intermittent control for a windshield wiper system in accordance with claim 8 further including switch means in said second path for selectively connecting said second motor terminal to said semiconductor means, said switch means including means for immediately causing a turn on pulse to be generated and applied to said semiconductor means when said switch means is first operated independent of the operation of said charging circuit.

10. An intermittent control for a windshield wiper system in accordance with claim 1 further including an additional thermistor connected in series with said motor, said additional thermistor being heat-coupled to said resistance element for controlling said motor current to decrease as the temperature of said resistance element increases.